May 12, 1964

M. DE BACCO ETAL 3,132,414

O-RING INSERTER

Filed Sept. 22, 1961

MICHAEL DE BACCO
HERBERT MONTGOMERY
*INVENTORS*

BY *S. A. Giarratana*
*George B. Ayersolk*
*ATTORNEYS*

United States Patent Office 3,132,414
Patented May 12, 1964

3,132,414
O-RING INSERTER
Michael De Bacco, West Caldwell, and Herbert Montgomery, Pine Brook, N.J., assignors to General Precision Inc., Little Falls, N.J., a corporation of Delaware
Filed Sept. 22, 1961, Ser. No. 140,098
1 Claim. (Cl. 29—235)

The present invention relates to the insertion of O-rings in machinery, and more particularly to a device for inserting O-rings.

O-rings are small resilient rings usually made of rubber which are inserted in various mechanical devices to act as seals or gaskets. If the O-ring is to be inserted in a readily accessible place, no particular problem is encountered. However, O-rings must usually be inserted in some inaccessible part of machinery. Generally, tweezers or similar devices are used to grasp the O-ring and insert it in position. Often the O-ring is torn and, although the cost of the O-ring itself is not too important, considerable time must be wasted in inserting several O-rings to get one properly in position. If the tear is not immediately discovered, the device containing the torn O-ring must be disassembled once the defect is discovered.

Although many attempts may have been made to overcome the foregoing difficulties and other difficulties, none, as far as we are aware, was entirely successful when carried into practice commercially on an industrial scale.

It has now been discovered that O-rings can be inserted into machinery readily, on a mass production assembly-line operation without any tearing of O-rings.

Thus, it is an object of the present invention to provide a means for the insertion of O-rings in machinery.

Another object of the present invention is to provide an O-ring inserter which will not damage the O-ring and which can be used by persons with little mechanical skill.

Figure 1:
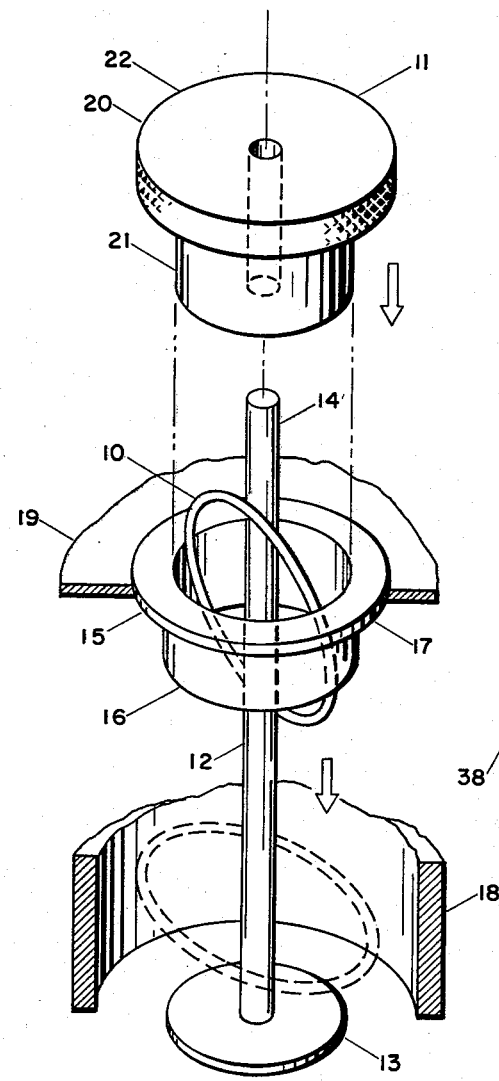
Figure 2:
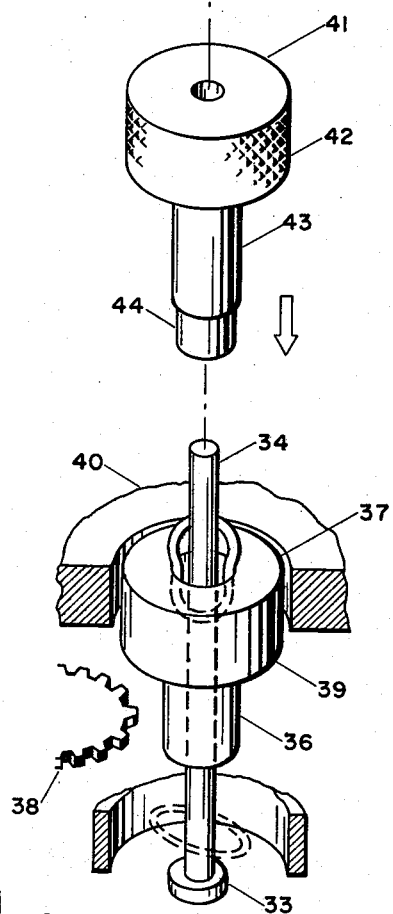

Other objects and advantages will become apparent from the following description taken in conjunction with the accompanying drawing in which:

FIGURE 1 is an exploded view of one embodiment of the device contemplated herein, and, FIGURE 2 shows an exploded view of another embodiment of the invention contemplated herein.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Generally speaking, the present invention contemplates a device for inserting O-rings into machinery comprising in combination, elongated guide means insertable into a piece of machinery to a spot where the O-ring is to be placed; hollow flanged O-ring retaining means including a tubular section sized so that the inserted O-ring will fit into said tubular section and be retained therein because of the outwardly expanding resilient characteristics of the O-ring; and, O-ring push-out means including an elongated tubular drum sized so as to pass through and fit over said guide means and into said O-ring retaining means tubular section, pushing out the retained O-ring when inserted therein, together with a flanged portion to engage the corresponding flanged portion on said O-ring retaining means, whereby, to insert an O-ring in a piece of machinery, said O-ring is inserted in said O-ring retaining means tubular section and said elongated guide means is inserted into said piece of macihnery to said spot. Said O-ring retaining means with the O-ring retained therein is then placed over said elongated guide means, the flange thereof preferably resting on the adjacent machinery, said O-ring push-out means is then used to push-out the O-ring by placing the push-out means tubular drum over said guide means and into said O-ring retaining means tubular section until the flange of said push-out means engages the flange of said retaining means, so that the O-ring falls along the elongated guide means to said spot.

In carrying the invention into practice, the O-ring inserter herein contemplated must be designed with reference to the machine or device into which the O-ring is to be placed. There is shown in the drawing an O-ring inserter 11 for rather large O-rings. The O-ring inserter for this type of O-ring has, as part of the combined inserter an elongated thin rod 12 at one end of which is a base disc 13. The thin rod 12 and the disc 13 form the guide means 14 along which the O-ring will slide into place. Cooperating with the elongated guide means 14 is the O-ring retaining means 15, which includes a tubular section 16 capable of retaining a particular O-ring 10 and a transverse flange 17 designed to rest on a portion of the machinery 19 into which the O-ring is to be inserted. As depicted in the drawing, guide means 14 is placed so that base 13 rests at the spot 18 in the machinery where the O-ring is to be inserted. The O-ring 10 is then placed in the O-ring retaining means 15 and the retaining means with O-ring 10 therein is placed over the guide means preferably until the flange 17 engages a part of the machinery 19 where the flange will be retained. Push-out means 20 include a tubular drum portion 21, the tubular aperture of which will just about fit over the thin rod 12 of the guide means 14, while the drum radius is sized to enter the tubular section 16 of retaining means 15; and, a transverse flange portion 22 shaped to engage flange 17 of the retaining means. When the drum portion 21 is inserted over the guide means 14 and pushed into tubular section 16 of the retaining means 15, the O-ring 10 in the retaining means will be pushed out of the retaining means and travel along the guide means 14 until it falls to the spot 18 in the machinery where the O-ring is to be placed.

In the event that smaller O-rings are used, the construction of the individual components may be suitably changed. Thus, elongated guide means 34 can be provided having a smaller base 33 of drum-shape rather than disc shape. The tubular section 36 of the O-ring retaining means 37 may be fairly lengthy protecting the O-ring against gears 38 or other parts of the machinery which will damage the O-ring. Flanged section 39 of the retaining means may likewise be drum shaped so as to fit into the intended machinery 40. Push-out means 41 may also have a drum-shaped flange 42 as well as an elongated tubular push-out drum 43 and to facilitate the entrance of the push-out drum 43 into the retaining means 37, push-out means 41 may also have a tip 44 narrower in diameter than the push-out drum.

It is to be observed therefore that the present invention provides for an O-ring inserter comprising in combination guide means insertable into a piece of machinery to a spot where the O-ring is to be placed; O-ring retaining means sized to retain an O-ring and fit over said guide means; and, O-ring push-out means adapted to push-out the O-ring retained in said retaining means along said guide means to said spot.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

We claim:

An O-ring inserter to fit an O-ring at an inaccessible place in a piece of machinery, comprising in combination:

an elongated cylindrical thin rod insertable into the machinery to said place where the O-ring is to be inserted, having a base disc at one end thereof, said rod and disc forming guide means along which the O-ring will slide into place;

hollow cylindrical O-ring retaining means including a central tubular section, the inner cylindrical wall of which is sized so that the O-ring will fit into said tubular section and be retained therein, with an outwardly extending upper peripheral flange to permit said O-ring retaining means to rest on an outer section of the machinery; and, solid cylindrical push-out means including a solid cylindrical drum section axially and radially sized to engage said inner cylindrical wall of the tubular section and an upper peripheral outwardly extending flange designed to fit over the flange of said retaining means, said push-out means having a central axial aperture through which said thin rod can pass, whereby, to insert an O-ring in a piece of machinery, said O-ring is first inserted in said O-ring retaining means tubular section and said guide means is inserted into said piece of machinery to said place, said O-ring retaining means, with the O-ring retained therein is then placed over said guide means, the flange thereof resting on the adjacent machinery, said O-ring push-out means is then used to push out the O-ring by placing the push-out means aperture over said guide means and pushing the drum section into said retaining means tubular section until the flange of said push-out means engages the flange of said retaining means so that the O-ring falls along the guide means to said place.

References Cited in the file of this patent

UNITED STATES PATENTS

| | | |
|---|---|---|
| 2,031,797 | Tarbox | Feb. 25, 1936 |
| 2,860,535 | Fowler | Nov. 18, 1958 |
| 2,930,640 | Davis et al. | Mar. 29, 1960 |
| 3,030,702 | Fowler | Apr. 24, 1962 |

FOREIGN PATENTS

| | | |
|---|---|---|
| 734,309 | Germany | Apr. 13, 1943 |